United States Patent
Verardo et al.

(10) Patent No.: US 9,235,192 B2
(45) Date of Patent: Jan. 12, 2016

(54) METHOD OF ADJUSTING THE OSCILLATION FREQUENCY OF A TIMEPIECE SUB-ASSEMBLY

(75) Inventors: Marco Verardo, Les Bois (CH); Philippe Barthoulot, Maiche (FR)

(73) Assignee: NIVAROX-FAR S.A., Le Locle (CH)

( * ) Notice: Subject to any disclaimer, the term of this patent is extended or adjusted under 35 U.S.C. 154(b) by 64 days.

(21) Appl. No.: 13/885,061

(22) PCT Filed: Nov. 17, 2011

(86) PCT No.: PCT/EP2011/070384
§ 371 (c)(1),
(2), (4) Date: Jul. 22, 2013

(87) PCT Pub. No.: WO2012/066094
PCT Pub. Date: May 24, 2012

(65) Prior Publication Data
US 2013/0308430 A1    Nov. 21, 2013

(30) Foreign Application Priority Data

Nov. 18, 2010    (EP) .................................... 10191646

(51) Int. Cl.
*G04B 17/20* (2006.01)
*G04B 17/06* (2006.01)
(Continued)

(52) U.S. Cl.
CPC .............. *G04B 17/06* (2013.01); *G04B 17/063* (2013.01); *G04D 7/08* (2013.01); *G04D 7/085* (2013.01);
(Continued)

(58) Field of Classification Search
CPC .... G04B 18/02; G04B 18/021; G04B 18/023; G04B 17/063
USPC .......................................... 368/170, 171, 200
See application file for complete search history.

(56) References Cited

U.S. PATENT DOCUMENTS 3,499,136 A * 3/1970 Nunnikhoven et al. ..... 219/69.17
3,727,027 A * 4/1973 Kaiser et al. ............. 219/121.69
(Continued)

FOREIGN PATENT DOCUMENTS

CH    347491    6/1960
CH    390 808   12/1964
(Continued)

OTHER PUBLICATIONS

International Search Report Issued Jul. 2, 2012 in PCT/EP11/70384 Filed Nov. 17, 2011.

*Primary Examiner* — Amy Cohen Johnson
*Assistant Examiner* — Daniel Wicklund
(74) *Attorney, Agent, or Firm* — Oblon, McClelland, Maier & Neustadt, L.L.P.

(57) ABSTRACT

A method of adjusting oscillation frequency of a timepiece regulating assembly with no index assembly, to a predetermined oscillation frequency, including: randomly taking a particular balance spring assembly from a production of toleranced products; measuring return torque of the balance spring assembly; randomly taking a balance from a production of toleranced products; calculating theoretical inertia of the particular balance required to achieve the predetermined oscillation frequency, according to the measured return torque of the balance spring; measuring real inertia of the particular balance; and by direct action on the particular balance, correcting the inertia of the particular balance to the calculated theoretical inertia value to obtain the predetermined oscillation frequency for the regulating assembly formed by the particular balance, and by the particular balance spring assembly.

21 Claims, 2 Drawing Sheets

(51) Int. Cl.
  *G04D 7/08* (2006.01)
  *G04D 7/10* (2006.01)
  *G04B 18/02* (2006.01)
  *G01M 1/00* (2006.01)

(52) U.S. Cl.
  CPC ............... *G04D 7/088* (2013.01); *G04D 7/10* (2013.01); *G01M 1/00* (2013.01); *G04B 18/02* (2013.01); *G04B 18/021* (2013.01); *G04B 18/023* (2013.01)

(56) References Cited

U.S. PATENT DOCUMENTS

| | | | |
|---|---|---|---|
| 4,259,563 A * | 3/1981 | Madeley | 219/121.69 |
| 6,609,822 B1 * | 8/2003 | Tokoro et al. | 368/171 |
| 2002/0070203 A1 * | 6/2002 | Serex | 219/121.69 |
| 2003/0072220 A1 * | 4/2003 | Mock et al. | 368/127 |
| 2003/0179655 A1 * | 9/2003 | Scheufele | 368/127 |
| 2007/0140065 A1 * | 6/2007 | Levingston | 368/127 |
| 2007/0222276 A1 * | 9/2007 | Verardo et al. | 301/12.1 |
| 2009/0303044 A1 * | 12/2009 | Furuichi et al. | 340/568.1 |
| 2010/0034057 A1 * | 2/2010 | Levingston | 368/175 |
| 2010/0054089 A1 * | 3/2010 | Maier et al. | 368/169 |
| 2012/0014229 A1 * | 1/2012 | Mallet et al. | 368/170 |
| 2012/0087214 A1 * | 4/2012 | Damasko | 368/169 |
| 2013/0188461 A1 * | 7/2013 | Mallet et al. | 368/170 |

FOREIGN PATENT DOCUMENTS

| | | |
|---|---|---|
| CH | 12 833 68 | 10/1972 |
| CH | 542 469 | 6/1973 |
| EP | 2 128 723 | 12/2009 |
| FR | 893 305 | 6/1944 |
| FR | 1 589 411 | 3/1970 |

* cited by examiner

METHOD OF ADJUSTING THE OSCILLATION FREQUENCY OF A TIMEPIECE SUB-ASSEMBLY

CROSS-REFERENCE TO RELATED APPLICATIONS

This is a National Phase Application in the United States of International Patent Application PCT/EP2011/070384 filed Nov. 17, 2011, which claims priority on European Patent Application No. 10191646.8 of Nov. 18, 2010. The entire disclosures of the above patent applications are hereby incorporated herein by reference.

FIELD OF THE INVENTION

The invention concerns a method of adjusting the oscillation frequency of a timepiece regulating assembly to a predetermined oscillation frequency, the timepiece regulating member having no index assembly and being formed of a balance and a balance spring assembly including at least one balance spring with at least one twist.

The invention also concerns a timepiece comprising at least one regulating member of this type.

The invention generally concerns the field of micro-mechanics and more specifically the field of horology.

More specifically, the invention concerns the adjustment and setting of regulating members and in particular of watch and timepiece balances, or of watch or timepiece sprung balance assemblies.

BACKGROUND OF THE INVENTION

Despite the extreme accuracy of machining operations and their high level of reproducibility, adjustments almost always have to be carried out, either during assembly operations, or, more frequently, during fine-tuning or finalising operations, in particular to set the unbalance and adjust inertia in the case of moving parts, and to set the frequency in the case of an oscillator.

It is particularly at the assembly stage that it is necessary to fine tune the pairing of certain components which, taken independently, are within machining or manufacturing tolerances, but which cannot be assembled purely and simply because of operating constraints peculiar to the sub-assembly or completed assembly.

This is particularly true of timepiece regulating members and more particularly of sprung balance assemblies. It seems, in fact that adjustments of unbalance and inertia settings, both static and dynamic, are already very difficult at the individual component stage, and that these fine tuning operations become extremely complex when the components are assembled to each other. In particular, dynamic adjustments are difficult to implement.

Various techniques are known for adjusting a sprung balance sub-assembly, two of which are most commonly used.

The "omega metric" system consists in:
grading the balance springs;
grading the balances;
pairing a balance chosen from a particular grade with a balance spring also selected from a particular grade, where said grades are compatible with each other.

This method requires a large stock of components and grades which are relatively broad.

Alternatively, the "Spiromatic system" is known:
generally a balance spring is assembled on a balance; the balance spring is cut to the right length, to obtain a torque suited to the inertia of the balance.

It is not possible with this method to guarantee the precise end position of the spring, resulting in a loss of chronometric performance.

These conventional techniques are either expensive, or mediocre as regards the accuracy of the results obtained.

SUMMARY OF THE INVENTION

The invention proposes to overcome the limitations of the prior art by proposing a simple, efficient and accurate method of forming and adjusting the physical characteristics of a timepiece component or sub-assembly, particular for the purposes of adjusting inertia and/or poising and/or a frequency setting. In the case of a sub-assembly, this concerns a pivotally movable sub-assembly, comprising at least one first component and at least one second component, one of said components comprising an elastic return means arranged to exert an elastic return torque, about said pivot axis, on at least one other of said components.

In particular, the invention concerns a method of adjusting a timepiece sprung balance sub-assembly, having no index assembly, with a very high level of chronometric performance.

According to the invention, this method of adjusting the oscillation frequency of a timepiece regulating assembly to a predetermined oscillation frequency, said regulating member having no index assembly and being formed of a balance and a balance spring assembly including at least one balance spring with at least one twist, is characterized in that:

a particular balance spring assembly is randomly taken from a production of toleranced products;
the return torque of said balance spring assembly is measured;
a balance is randomly taken from a production of toleranced products;
a calculation is made of the theoretical inertia of said particular balance required to achieve said predetermined oscillation frequency, according to said measured return torque of said taken balance spring;
the real inertia of said particular balance is measured;
the inertia of said particular balance is corrected, by direct action on the felloe and/or at least one arm of said particular balance, to said calculated theoretical inertia value in order to obtain said predetermined oscillation frequency for said regulating assembly formed by said particular balance, and by said particular balance spring assembly.

According to a feature of the invention, said particular balance is taken from an output wherein the inertia of each balance relative to the pivot axis thereof is toleranced relative to a predefined inertia threshold.

According to a feature of the invention, there is no change to the point of attachment of said particular balance spring, which remains at a defined active length while it is actually produced as a simple component.

According to a feature of the invention, the inertia of said particular balance is locally corrected downwards by the removal of material, via ablation using an energy source remote from the surface of said particular balance.

According to a feature of the invention, the inertia of said particular balance is locally corrected upwards by the addition of material, by remote spraying from a distance the surface of said particular balance.

According to a feature of the invention, the inertia of said particular balance is locally corrected upwards or downwards by the displacement of material, via embossing or by the local melting and displacement of the liquid phase resulting from said melting.

According to a feature of the invention, said particular balance is provided with adjustment inertia blocks, which are secured to said particular balance in a stop or indexing position in which they are held immobile during each inertia measurement of said particular balance and during each inertia correction of said particular balance.

According to a feature of the invention, the inertia of said particular balance is corrected on said particular balance in isolation from said particular balance spring assembly.

According to a feature of the invention, the inertia of said particular balance is corrected on said particular balance when assembled to said particular balance spring assembly.

According to a feature of the invention, the inertia of said particular balance is corrected during a pivoting motion imparted thereon by a driving means.

The invention further concerns a timepiece comprising at least one regulating member, characterized in that said at least one regulating member is a timepiece regulating assembly with no index assembly formed of a balance and a balance spring assembly comprising at least one balance spring, said balance being adjusted to said balance spring assembly in accordance with the method of the invention or of its above variants.

According to a feature of the invention, said at least one regulating member is a timepiece regulating assembly with no index assembly formed solely of a balance and a balance spring assembly comprising at least one balance spring, said balance being adjusted to said balance spring assembly according to said method.

According to a feature of the invention, said regulating assembly with no index assembly is formed solely of a single piece balance and of a balance spring assembly comprising at least one balance spring, the only movable members of said regulating assembly being formed by said balance and by said balance spring assembly.

According to another feature of the invention, said regulating assembly with no index assembly is formed solely of a single piece balance and of a balance spring assembly comprising at least one balance spring and a set of adjustment inertia blocks secured to said balance in a stop or indexing position in which they are held immobile during each said inertia measurement of said balance and during each said inertia correction of said balance, and the only movable members of said regulating assembly are formed by said balance, said balance spring assembly, and said adjustment inertia blocks.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

The invention generally concerns the field of micro-mechanics and more specifically the field of horology.

Figure 4:
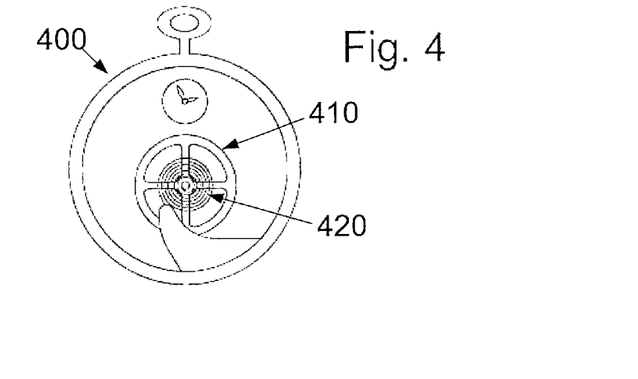
FIG. 4 is a schematic representation of a watch that includes a balance and a spring balance assembly.

More specifically, the invention concerns the adjustment and setting of regulating members and in particular of watch and timepiece balances, or of watch or timepiece sprung balance assemblies. For example, FIG. 4 is a schematic representation of a watch 400 that includes a balance 410 and a spring balance assembly 420.

Figure 1:
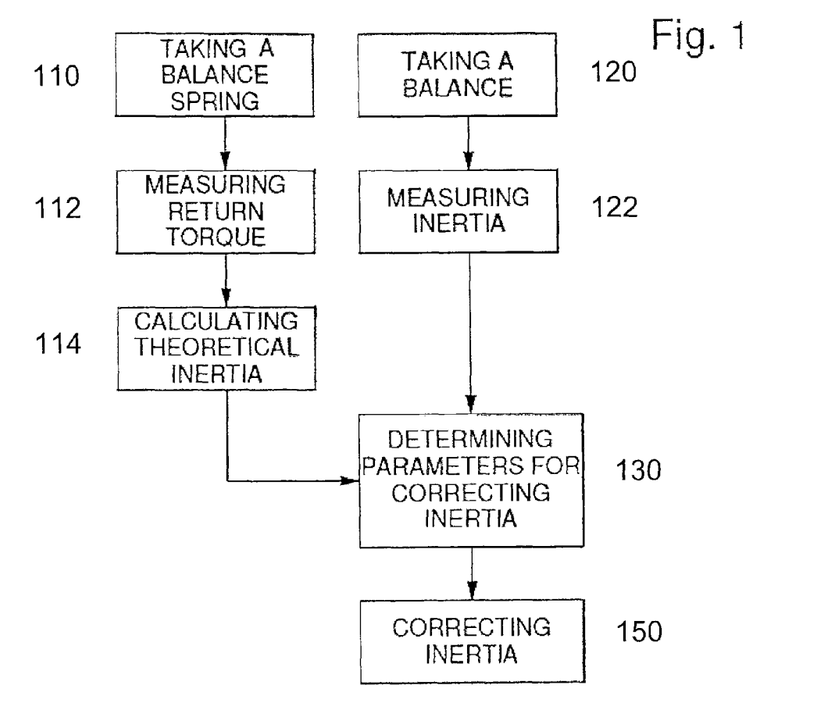
FIG. 1 illustrates an example of a method according to the present disclosure in which the inertia of a balance is corrected on the balance in isolation from a balance spring assembly.
Figure 2:
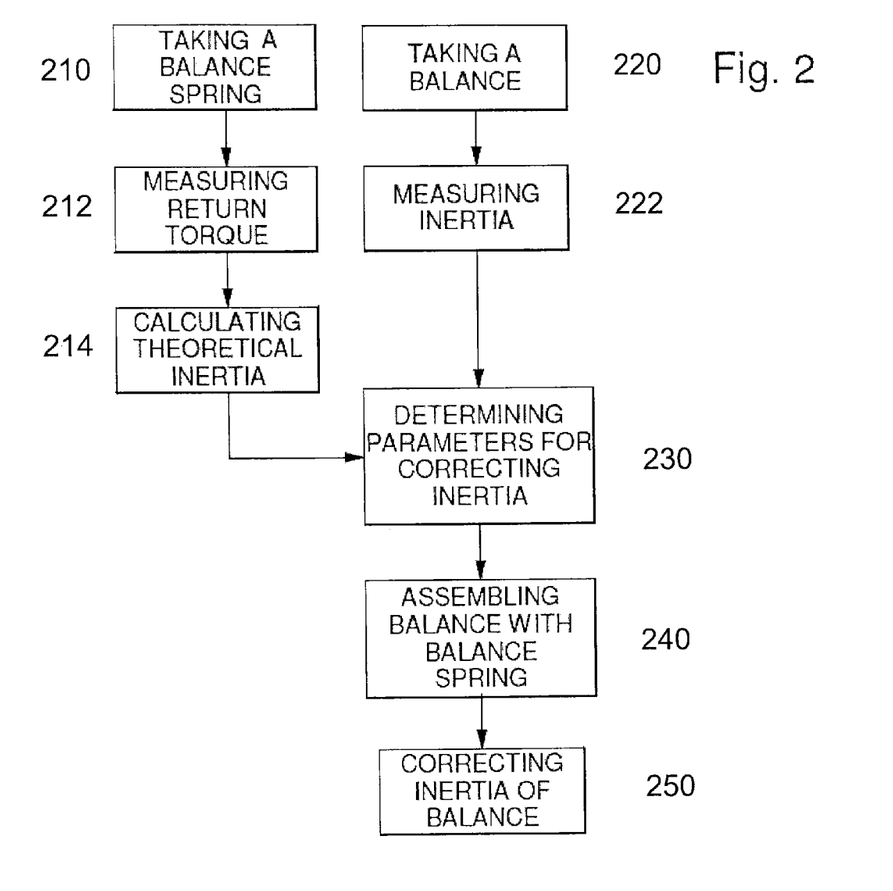
FIG. 2 illustrates an example of a method according to the present disclosure in which the inertia of a balance is corrected on the balance when assembled to a balance spring assembly.

In particular, the invention concerns a method of adjusting the oscillation frequency of a timepiece regulating assembly to a predetermined oscillation frequency, said regulating member having no index assembly and being formed of a balance and a balance spring assembly including at least one balance spring with at least one twist, characterized in that, as shown in FIGS. 1 and 2:

a particular balance spring assembly is randomly taken from a production of toleranced products (110, 210);

the return torque of said balance spring assembly is measured (112, 212);

a balance is randomly taken from a production of toleranced products (120, 220);

a calculation is made of the theoretical inertia IT of the particular balance required to achieve the predetermined oscillation frequency, according to the measured return torque of the taken balance spring (114, 214);

the real inertia IR of the particular balance is measured (122, 222);

the inertia of said particular balance is corrected, by direct action on the felloe and/or at least one arm of the particular balance, to the calculated theoretical inertia value IT in order to obtain the predetermined oscillation frequency for the regulating assembly formed by the particular balance, and by the particular balance spring assembly (150, 250).

Preferably, the particular balance is taken from an output wherein the inertia of each balance relative to the pivot axis thereof is greater and is toleranced relative to a pre-defined inertia threshold. In a particular, non-limiting, alternative implementation of the invention, the inertia is greater than an inertia threshold value IS.

Advantageously, no change is made to the point of attachment of the particular balance spring assembly, which remains at a defined active length while it is actually produced as a simple component.

Figure 3:
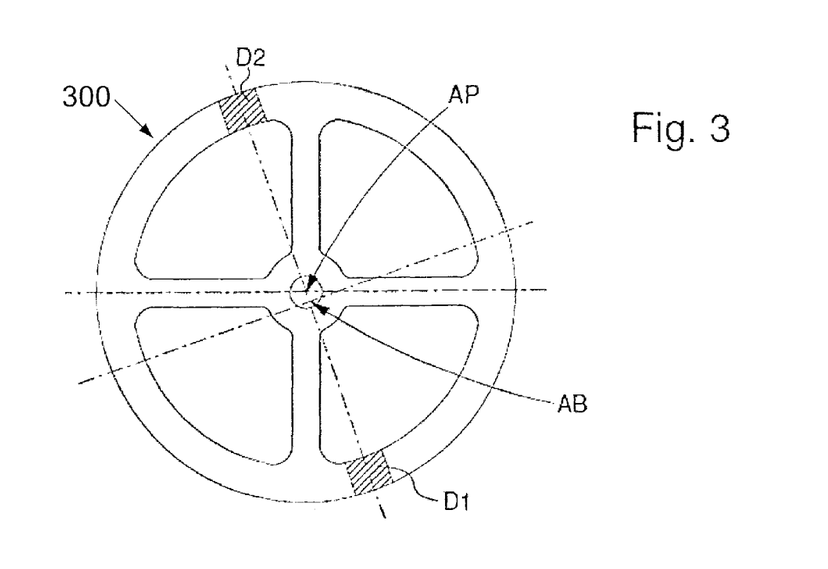
FIG. 3 illustrates an example of correcting inertia of a balance according to the present disclosure.

In an advantageous implementation of the method, explained with reference to FIG. 3, the method includes determining parameters for correcting inertia of the balance (FIG. 1, 130; FIG. 2, 230):

the unbalance axis AB and the unbalance value ΔB of the particular balance 300 and the position of the unbalance on unbalance axis AB are determined so as to define, on either side of pivot axis AP of the particular balance:

a first domain D1 on the side of the unbalance, and a second domain D2 on the opposite side to the unbalance, the inertia of this particular balance 300 is corrected symmetrically relative to the pivot axis of the particular balance, by creating at least one zone where an elementary quantity of material is added or removed, each said zone located in first domain D1 being called the first zone and corresponding to a first algebraic variation of mass $M1i$, each zone located in second domain D2 being called the second zone and corresponding to a second algebraic variation of mass $M2j$, so that:

the difference between:

the integrated sum of the moments of inertia with respect to the unbalance axis AB of the second algebraic variations of mass $M2j$, on the one hand, and on the other hand the integrated sum of the moments of inertia with respect to unbalance axis AB of said first algebraic variations of mass $M1i$, is equal to the unbalance value $\Delta B$, and so that:

the difference between:

on the one hand the integrated sum of the moments of inertia with respect to an axis perpendicular to unbalance axis AB and passing through the pivot axis of the second algebraic variations of mass $M2j$, and on the other hand the integrated sum of the moments of inertia with respect to an axis perpendicular to unbalance axis AB and passing through the pivot axis of said first algebraic variations of mass $M1i$, is equal to zero, and also so that:

the sum between:

the integrated sum of the moments of inertia with respect to the unbalance axis AB of the second algebraic variations of mass $M2j$, on the one hand, and the integrated sum of the moments of inertia with respect to the unbalance axis AB of the first algebraic variations of mass $M1i$ on the other hand, is equal to the difference between the real inertia IR and the theoretical inertia IT.

In a particular embodiment, these zones are created where an elementary quantity of material is added or removed, aligned in substantially symmetrical pairs relative to the pivot axis of the particular balance.

In a particular embodiment, a plurality of zones of added or removed material are created, all aligned on unbalance axis AB.

In a particular embodiment, the unbalance axis AB and the unbalance value $\Delta B$ of the particular balance are determined, and the unbalance of said balance is corrected, then the inertia thereof is adjusted relative to the pivot axis thereof.

In another particular embodiment, the unbalance axis AB and unbalance value $\Delta B$ of the particular balance are determined, and the unbalance of said particular balance is corrected while the inertia thereof is adjusted relative to the pivot axis.

In yet another particular embodiment, the unbalance axis AB and unbalance value AB of the particular balance are determined and, during correction of the inertia of the particular balance, at least one rough correction is made so as to bring the real inertia of the particular balance closer to the calculated theoretical inertia IT, and during the rough correction the unbalance AB is eliminated from the particular balance for the poising of said balance, then at least one new inertia measurement is carried out for the particular balance, and a final inertia correction is made to adjust the inertia of the particular balance to the calculated theoretical value IT.

In a particular embodiment, the inertia of the particular balance is locally corrected downwards by the removal of material, via ablation using an energy source remote from the surface of the particular balance.

In a particular embodiment, the inertia of the particular balance is locally corrected upwards by the addition of material, by remote spraying from a distance the surface of the particular balance.

In a particular embodiment, the inertia of the particular balance is locally corrected upwards or downwards by the displacement of material, via embossing or by the local melting and displacement of the liquid phase resulting from said melting.

In a particular embodiment, the particular balance is provided with adjustment inertia blocks, which are secured to the particular balance in a stop or indexing position in which they are held immobile during each inertia measurement of the particular balance and during each inertia correction of the particular balance.

In a particular embodiment, each said inertia block is immobilised by reversible bonding for the entire duration of the method and until the particular balance is inserted in a timepiece movement.

In a particular embodiment, as shown in FIG. 1, the inertia of said particular balance is corrected on the particular balance in isolation from the particular balance spring assembly.

In another particular embodiment, as shown in FIG. 2, the inertia of the particular balance is corrected on the particular balance when assembled to the particular balance spring assembly (240).

In a particular embodiment, the inertia of the particular balance is corrected during a pivoting motion imparted thereon by a driving means.

In a particular embodiment, the inertia of the particular balance is corrected in the form of product tracking anti-counterfeiting marks which are in symmetrical pairs relative to the pivot axis of the particular balance. In a particular embodiment, a product tracking reference mark, peculiar to the particular balance spring with respect to which the particular balance is adjusted, is made on the particular balance during correction of the inertia thereof.

In a particular embodiment, the product tracking mark is made in the form of a barcode or a two-dimensional high density matrix code.

The invention also concerns a movement or a timepiece comprising at least one regulating member.

According to the invention, this at least one regulating member is a timepiece regulating assembly with no index assembly formed of a balance and a balance spring assembly comprising at least one balance spring, said balance being adjusted to said balance spring assembly in accordance with said method.

In a particular embodiment, this at least one regulating member is a timepiece regulating assembly with no index assembly formed solely of a balance and a balance spring assembly comprising at least one balance spring, said balance being adjusted to said balance spring assembly in accordance with this method.

In a particular embodiment, this at least one regulating assembly with no index assembly is solely formed of a single piece balance and a balance spring assembly comprising at least one balance spring, the only movable members of the regulating assembly being formed by said balance and said balance spring assembly.

In another particular embodiment, this regulating assembly with no index assembly is formed solely of a single piece balance and a balance spring assembly comprising at least one balance spring and a set of adjustment inertia blocks secured to the balance in a stop or indexing position wherein they are fixedly held during each inertia measurement of the balance and during each inertia correction of the balance, and the only movable members of the regulating assembly are formed by the balance, the balance spring assembly and the adjustment inertia blocks.

The invention allows a sprung balance timepiece assembly to be adjusted with a very high level of chronometric performance.

More generally, the invention perfects a method of adjusting the physical features, and/or unbalance, and/or inertia, and/or oscillation frequency of a component and, preferably of a component or a sub-assembly which is pivotally movable about a pivot axis.

In the case of a sub-assembly, this concerns a pivotally movable sub-assembly, comprising at least one first component and at least one second component, one of said components comprising an elastic return means arranged to exert an elastic return torque, about said pivot axis, on at least one other of said components.

In short, according to the invention, this method of setting the frequency of a sub-assembly pivotally movable about a pivot axis, comprising at least one first component and at least one second component, said at least one first component comprising a return means arranged to exert an elastic return torque on the second component about said pivot axis, consists in:
  measuring the return torque of said at least one first component, or the resulting torque of the first components if there are several, and measuring the inertia of the second component;
  then correcting the inertia of the second component and/or correcting the return torque of the at least one first component, or the resulting torque of the first components if there are several.

In a preferred implementation of the invention, described here in detail, there is no correction of the return torque of the at least one first component which is randomly extracted from a production of a production of toleranced products capable of the desired oscillation frequency in combination with a second component of the theoretic ad hoc value. Consequently, very advantageously, adjustment operations only have to be performed on a single component, which is the easiest to machine or transform.

This inertia and/or return torque correction is carried out in accordance with the tolerances peculiar to the operation of the sub-assembly concerned.

Naturally, each of the first components and second components can be made in the form of an elementary sub-assembly, and the inertia and/or return torque corrections, as appropriate, may be applied to certain elementary components of such elementary sub-assemblies, which are chosen for the ease with which corrections can be made, for example for their machinability, deformability, aptitude to receive a heat or surface treatment, for their memory shaping properties, density, or for any other characteristic or physical property which allows easy and accurate correction.

In a particular and preferred application of the invention, the first component is a timepiece balance spring and the second component is a timepiece balance. Corrections may then advantageously be made, in the first case to coils or zones prepared for this purpose, or in the second case to inertia blocks, regulating screws, pins or suchlike, although these examples are not restrictive.

In a particular implementation of the method, it is applied to a plurality of second components which pivot about the same pivot axis. In this case, instead of correcting the inertia of a single second component, the accumulated inertia of the plurality of second components is corrected. Depending upon the particular case, the inertia correction may be distributed over the various second components, or another rule may be adopted, for example according to the ease with which the selected correction technique can be implemented, on one second component or another. According to a preferred rule, the plurality of second components is corrected, so that the centre of inertia thereof remains on the pivot axis.

In a preferred implementation, only described above, it is chosen to correct the inertia of the second component.

In another implementation of the invention, it is possible to choose to correct the return torque of the first component or the resulting torque of the first components if there are several. In the latter case, depending upon the particular case, the return torque correction may be distributed over the various first components, or another rule may be adopted, for example according to the ease with which the selected correction technique can be implemented, on one first component or another. According to a preferred rule, the plurality of first components is corrected, so that at least the centre of gravity thereof and if possible the centre of inertia thereof, remains on the pivot axis.

In yet another implementation of the invention, it is chosen to correct both the inertia of the second component and the return torque of the at least one first component.

To reduce the inertia of the second component, various means are possible, and may be combined:
  the inertia of the second component is corrected downwards by the removal of material and/or displacement of material, and/or
  the inertia of the second component is corrected downwards by the removal of material and/or
  the inertia of the second component is corrected downwards by the displacement of material.

To increase the inertia of the second component various means are possible and may be combined with each other:
  the inertia of the second component is corrected upwards by the addition of material and/or displacement of material, and/or
  the inertia of the second component is corrected upwards by the addition of material and/or
  the inertia of the second component is corrected upwards by the displacement of material.

Naturally, these inertia corrections may also, if necessary, be combined with corrections to the main inertia axis, and compensating for unbalance. When the second component is already balanced, within suitable static and/or dynamic balancing tolerances, the inertia corrections are preferably carried out in a balanced or symmetrical manner, as appropriate.

Likewise, according to the invention, the return torque of the at least one first component could be corrected by removing material and/or by adding material and/or by displacing material. Advantageously, this return torque may also be modified by a local or total heat treatment, without removing material. This technology is advantageous in the case where the at least one first component is a timepiece balance spring and the second component is a timepiece balance. Indeed, a heat treatment may be carried out at the assembled stage of the sprung balance.

Jointly with the correction operations performed on the first or on the second component, the removal of material may be achieved by machining with a tool, for example by milling, turning, drilling, rectifying or other means.

The removal of material may also be achieved by ablation using an energy source remote from the surface of the second component, or of the first component as appropriate, by laser, microlaser, nanolaser, picolaser, femto laser, electro-erosion or other means.

Naturally, these different types of material removal may be combined, and the selection thereof depends above all on the morphology of the component and the accessibility thereof, either static or dynamic when the inertia or torque corrections are required to be performed on a moving component or sub-assembly.

As regards the alternative wherein material is with respect to the first component or to the second component, the material may be added by remote spraying from a distance the surface of the second component. This spraying may be achieved with any material having suitable adherence relative to the receiving surface, and the added material may, in particular, be a metal, an alloy, an adhesive, ink, resin or other material.

The spraying vector may be mechanical, such as a printing or jet head, or be formed by a plasma spray torch or other element.

Naturally, it is possible to combine the operations of adding, removing and displacing material, which may be necessary depending on the finesse of the adding, removing and displacing operations.

As regards the latter, material may be displaced by deformation, embossing or other means.

Material may also be displaced via the local melting and displacement of the liquid phase resulting from melting. In particular, if the component concerned is in motion, for example pivoting, it is advantageous to use, for example, centrifugal force to displace a flow of material, moving it away from the pivot axis.

The method may thus be applied to a second component which is a timepiece balance comprising a peripheral felloe and pivotally movable about a balance axis, to correct the inertia thereof.

This method may also be applied to a first component, which is a balance spring comprising an elastic return means arranged to exert an elastic return torque, for correcting the return torque thereof. This arrangement offers the advantage of modifying the balance spring torque, by implementing the aforecited techniques, while preserving the length of the balance spring, which overcomes the drawbacks of the prior art.

Control of the output of production having a specified tolerance, of the first components and of the second components, is essential to enable adjustments to be fine tuned easily at a lower cost:

the possibility of acting on only one component, preferably the second component;
  the extent of the unbalance and inertia corrections to be performed en masse is very low due to the narrow tolerances of the simple components.

In short, the invention removes the requirement to classify components into grades and especially the requirement for the associated stock, which represents a significant financial investment. The invention allows a sub-assembly to be easily formed within the required static and dynamic tolerances.

When applied to a timepiece regulating assembly, it guarantees perfect frequency setting. It is therefore unnecessary to keep an index assembly to play on the point of attachment of the balance spring.

This is why the invention is very advantageously described here for the preferred application to a sprung balance assembly with no index assembly.

The invention claimed is:

1. A method of adjusting oscillation frequency of a timepiece regulating assembly with no index assembly, formed solely of a balance and a balance spring assembly including at least one balance spring with at least one twist, to a predetermined oscillation frequency, only movable members of the regulating assembly being formed by the balance and by the balance spring assembly, the method comprising:
   taking a particular balance spring assembly from a production of toleranced products;
   measuring return torque of the particular balance spring assembly;
   taking a particular balance from a production of toleranced products;
   calculating a theoretical inertia of the particular balance at which said regulating assembly oscillates at said predetermined oscillation frequency, according to the measured return torque of the taken particular balance spring assembly;
   measuring an actual inertia of the particular balance;
   correcting inertia of the particular balance alone in isolation from the particular balance spring assembly, by direct action on a felloe or at least one arm of the particular balance, to the calculated theoretical inertia to obtain the predetermined oscillation frequency for the regulating assembly formed by the particular balance and by the particular balance spring assembly, wherein the inertia of the particular balance is locally corrected upwards or downwards by displacement of material of the particular balance, by local melting and displacing of a liquid phase of the material resulting from the melting;
   determining parameters for correcting inertia of the particular balance alone in isolation from the particular balance spring assembly, by determining an unbalance axis and an unbalance value of the particular balance and a position of an unbalance on the unbalance axis to define, on either side of a pivot axis of the particular balance:
     a first domain on a side of the unbalance; and
     a second domain on an opposite side to the unbalance;
   wherein the correcting the inertia of the particular balance symmetrically relative to the pivot axis of the particular balance includes creating at least one zone, each zone located in the first domain being a first zone and corresponding to a first algebraic variation of mass, each zone located in the second domain being a second zone and corresponding to a second algebraic variation of mass, so that:
     a difference between (a) an integrated sum of moments of inertia with respect to the unbalance axis of the second algebraic variation of mass and (b) an integrated sum of moments of inertia with respect to the unbalance axis of the first algebraic variation of mass, is equal to the unbalance value,
   and so that:
     a difference between (c) an integrated sum of moments of inertia with respect to an axis perpendicular to the unbalance axis and passing through the pivot axis of the second algebraic variation of mass and (d) an integrated sum of moments of inertia with respect to an axis perpendicular to the unbalance axis and passing through the pivot axis of the first algebraic variation of mass, is equal to zero;
   and so that:
     a sum between (e) the integrated sum of moments of inertia with respect to the unbalance axis of the second algebraic variation of mass and (f) the integrated sum of moments of inertia with respect to the unbalance axis of the first algebraic variation of mass, is equal to a difference between the actual inertia and the theoretical inertia.

2. The method according to claim 1, wherein the particular balance is taken from a production of products, wherein the inertia of each balance relative to the pivot axis thereof is toleranced relative to a predefined inertia.

3. The method according to claim 1, wherein there is no change to a point of attachment of the particular balance spring, which remains at a defined active length during actual production of the balance spring as a simple component.

4. The method according to claim 1, wherein the zones are created where a quantity of material is added or removed, aligned in substantially symmetrical pairs relative to the pivot axis of the particular balance.

5. The method according to claim 1, wherein a plurality of zones of added or removed material are created, all aligned on the unbalance axis.

6. The method according to claim 1, wherein the unbalance axis and the unbalance value of the particular balance are determined, and the unbalance of the balance is corrected and then the inertia thereof is adjusted relative to the pivot axis thereof.

7. The method according to claim 1, wherein the unbalance axis and the unbalance value of the particular balance are determined, and the unbalance of the particular balance is corrected while the inertia thereof is adjusted relative to the pivot axis thereof.

8. The method according to claim 1, wherein the unbalance axis and the unbalance value of the particular balance are determined, and wherein, during the inertia correction of the particular balance, a rough correction is made to bring the actual inertia of the particular balance closer to the calculated theoretical inertia, and during the rough inertia correction, the unbalance of the particular balance is eliminated for poising thereof, then at least one new inertia measurement of the particular balance and a final inertia correction of the particular balance are made to adjust the inertia to a value of the calculated theoretical inertia.

9. The method according to claim 1, wherein the inertia of the particular balance is locally corrected downwards by removal of material, via ablation using an energy source remote from a surface of the particular balance.

10. The method according to claim 1, wherein the inertia of the particular balance is locally corrected upwards by addition of material, by remote spraying from a distance a surface of the particular balance.

11. The method according to claim 1, wherein the inertia of the particular balance is locally corrected upwards or downwards by the displacement of material via embossing.

12. The method according to claim 1, wherein the particular balance is provided with adjustment inertia blocks, which are secured to the particular balance in a stop or indexing position in which the inertia blocks are fixedly held during each inertia measurement of the particular balance and during each inertia correction of the particular balance, and wherein each inertia block is immobilized by reversible bonding for an entire duration of the method, and until the particular balance is inserted in a timepiece movement.

13. The method according to claim 1, wherein the inertia of the particular balance is corrected during a pivoting motion imparted thereon by a driving means.

14. The method according to claim 1, wherein the inertia of the particular balance is corrected in a form of product tracking anti-counterfeiting marks that are in symmetrical pairs relative to the pivot axis of the particular balance.

15. The method according to claim 1, wherein a product tracking reference mark, peculiar to the particular balance spring with respect to which the particular balance is adjusted, is made on the particular balance during correction of the inertia thereof.

16. The method according to claim 15, wherein the product tracking reference mark is made in a form of a barcode or a two-dimensional high density matrix code.

17. The method according to claim 1, further comprising modifying the return torque of said particular balance spring assembly by a local or total heat treatment, without removing material, at an assembled stage of the balance that is sprung.

18. A method of adjusting oscillation frequency of a timepiece regulating assembly with no index assembly, formed solely of a balance and a balance spring assembly including at least one balance spring with at least one twist, to a predetermined oscillation frequency, only movable members of the regulating assembly being formed by the balance and by the balance spring assembly, the method comprising:

taking a particular balance spring assembly from a production of toleranced products;

measuring return torque of the particular balance spring assembly;

taking a particular balance from a production of toleranced products;

calculating a theoretical inertia of the particular balance at which said regulating assembly oscillates at said predetermined oscillation frequency, according to the measured return torque of the taken particular balance spring assembly;

measuring an actual inertia of the particular balance;

correcting inertia of the particular balance when assembled to the particular balance spring assembly, by direct action on a felloe or at least one arm of the particular balance, to the calculated theoretical inertia to obtain the predetermined oscillation frequency for the regulating assembly formed by the particular balance and by the particular balance spring assembly, wherein the inertia of the particular balance is locally corrected upwards or downwards by displacement of material of the particular balance, by local melting and displacing of a liquid phase of the material resulting from the melting;

determining parameters for correcting inertia of the particular balance when assembled to the particular balance spring assembly, by determining an unbalance axis and an unbalance value of the particular balance and a position of an unbalance on the unbalance axis to define, on either side of a pivot axis of the particular balance:
 a first domain on a side of the unbalance; and
 a second domain on an opposite side to the unbalance;

wherein the correcting the inertia of the particular balance symmetrically relative to the pivot axis of the particular balance includes creating at least one zone, each zone located in the first domain being a first zone and corresponding to a first algebraic variation of mass, each zone located in the second domain being a second zone and corresponding to a second algebraic variation of mass, so that:
 a difference between (a) an integrated sum of moments of inertia with respect to the unbalance axis of the second algebraic variation of mass and (b) an integrated sum of moments of inertia with respect to the unbalance axis of the first algebraic variation of mass, is equal to the unbalance value, and so that:
 a difference between (c) an integrated sum of moments of inertia with respect to an axis perpendicular to the unbalance axis and passing through the pivot axis of the second algebraic variation of mass and (d) an integrated sum of moments of inertia with respect to an axis perpendicular to the unbalance axis and passing through the pivot axis of the first algebraic variation of mass, is equal to zero;

and so that:

a sum between (e) the integrated sum of moments of inertia with respect to the unbalance axis of the second algebraic variation of mass and (f) the integrated sum of moments of inertia with respect to the unbalance axis of the first algebraic variation of mass, is equal to a difference between the actual inertia and the theoretical inertia.

19. The method according to claim 18, further comprising modifying the return torque of said particular balance spring assembly by a local or total heat treatment, without removing material, at an assembled stage of the balance that is sprung.

20. A timepiece comprising:

at least one regulating mechanism, wherein the at least one regulating mechanism is a timepiece regulating mechanism with no index assembly, formed solely of an adjusted balance and of a balance spring assembly including at least one balance spring with at least one twist, only movable members of the regulating mechanism being formed by the adjusted balance and by the balance spring assembly, the adjusted balance, which has zero unbalance and a theoretical inertia at which said regulating mechanism oscillates at a predetermined oscillation frequency, includes a particular balance and material of the particular balance that is melted and displaced in a liquid phase resulting from local melting, the melted and displaced material locally corrects an inertia of the particular balance upwards or downwards, and wherein, on either side of a pivot axis of the particular balance, the particular balance includes:

a first domain on a side of an unbalance; and a second domain on an opposite side to the unbalance;

wherein the particular balance includes zones, each zone located in the first domain being a first zone and corresponding to a first algebraic variation of mass, each zone located in the second domain being a second zone and corresponding to a second algebraic variation of mass;

wherein a difference between: (a) an integrated sum of moments of inertia with respect to an axis perpendicular to an unbalance axis and passing through the pivot axis of the second algebraic variation of mass and (b) an integrated sum of moments of inertia with respect to an axis perpendicular to the unbalance axis and passing through the pivot axis of the first algebraic variation of mass, is equal to zero, and wherein a difference between: (c) an integrated sum of moments of inertia with respect to the unbalance axis of the second algebraic variation of mass and (d) an integrated sum of moments of inertia with respect to the unbalance axis of the first algebraic variation of mass, is equal to an unbalance value; and a sum between: (e) an integrated sum of moments of inertia with respect to the unbalance axis of the second algebraic variation of mass and (f) an integrated sum of moments of inertia with respect to the unbalance axis of the first algebraic variation of mass, is equal to a difference between an actual inertia of said particular balance and the theoretical inertia.

21. A method of adjusting oscillation frequency of a timepiece regulating assembly with no index assembly, formed solely of a first component being a balance and a second component being a balance spring assembly including at least one balance spring with at least one twist, to a predetermined oscillation frequency, only movable members of the regulating assembly being formed by the balance and by the balance spring assembly, the method comprising:

without classifying the first and second components into grades, taking a particular balance spring assembly and a particular balance from a production of toleranced products;

measuring return torque of the particular balance spring assembly;

measuring an actual inertia of the particular balance;

correcting inertia of the particular balance locally upwards or downwards by displacement of material of the particular balance, by local melting and displacing of a liquid phase of the material resulting from the melting; and modifying the return torque of said particular balance spring assembly by a local or total heat treatment, without removing material, at an assembled stage of the particular balance that is sprung.

* * * * *